(12) United States Patent
Buehlmeyer et al.

(10) Patent No.: US 9,120,405 B2
(45) Date of Patent: *Sep. 1, 2015

(54) VEHICLE SEAT WITH LATERAL SUPPORT ELEMENT

(71) Applicant: GRAMMER AG, Amberg (DE)

(72) Inventors: Katja Buehlmeyer, Kuemmersbruck (DE); Erwin Haller, Birgland (DE); Jens Kolb, Koenigstein (DE); Roland Uebelacker, Pfreimd (DE); Christian Erker, Hahnbach (DE)

(73) Assignee: Grammer AG, Amberg (GE)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,337

(22) Filed: Nov. 27, 2012

(65) Prior Publication Data

US 2013/0175837 A1    Jul. 11, 2013

(30) Foreign Application Priority Data

Nov. 30, 2011    (DE) .......................... 10 2011 055 895

(51) Int. Cl.
*A47C 1/10*    (2006.01)
*A47C 7/36*    (2006.01)
(Continued)

(52) U.S. Cl.
CPC ................ *B60N 2/38* (2013.01); *B60N 2/2222* (2013.01); *B60N 2/2851* (2013.01); *B60N 2/4606* (2013.01); *B60N 2/4855* (2013.01); *B60N 2/64* (2013.01); *B60N 2/4808* (2013.01)

(58) Field of Classification Search
CPC .......... B60N 2/38; B60N 2/64; B60N 2/4808; B60N 2/2222

USPC ......... 297/407, 408, 406, 397, 396, 398, 383, 297/242, 337, 391, 409
See application file for complete search history.

(56) References Cited

U.S. PATENT DOCUMENTS 769,495 A * 9/1904 Schroeder .................. 297/230.1
937,343 A   10/1909 Wallace
(Continued)

FOREIGN PATENT DOCUMENTS

AT    321497      4/1975
DE    1 796 557   9/1959
(Continued)

OTHER PUBLICATIONS

U.S. Appl. No. 13/686,409, Buehlmeyer et al.
(Continued)

*Primary Examiner* — Chi Q Nguyen
(74) *Attorney, Agent, or Firm* — Sheridan Ross P.C.

(57) ABSTRACT

The invention relates to a vehicle seat with a seat part and with a seat back part for supporting a driver of the vehicle in the sitting position on the vehicle seat, wherein the vehicle seat is characterized by an additional vehicle driver's torso support device which can be disposed outside the seat part and the seat back part and which can be temporarily disposed at least partially in an otherwise seat-free torso support region at the level of or above the upper third of the seat back part in front of the seat back part and laterally off-center on the seat back part, in order to provide support, laterally off-center of the seat back part, at least at the level of the shoulder or chest region of the driver who is sitting on the vehicle seat when he adopts a seated working posture oriented to the side or backwards, wherein the additional vehicle driver's torso support device is disposed so as to be movable by a moving device from a parked position into an additional torso support position in the otherwise seat-free torso support region.

9 Claims, 6 Drawing Sheets

(51) Int. Cl.
| | |
|---|---|
| *A61G 15/00* | (2006.01) |
| *B60R 22/28* | (2006.01) |
| *B60N 2/38* | (2006.01) |
| *B60N 2/22* | (2006.01) |
| *B60N 2/28* | (2006.01) |
| *B60N 2/46* | (2006.01) |
| *B60N 2/64* | (2006.01) |
| *B60N 2/48* | (2006.01) |

(56) References Cited

U.S. PATENT DOCUMENTS

| | | | | |
|---|---|---|---|---|
| 1,257,427 | A | | 2/1918 | Underwood |
| 2,835,311 | A | * | 5/1958 | Reeves et al. ............. 297/230.11 |
| 3,300,249 | A | * | 1/1967 | Schneider ...................... 297/408 |
| 3,342,528 | A | | 9/1967 | Radke et al. |
| 3,348,880 | A | * | 10/1967 | Swann ...................... 297/228.13 |
| 3,393,938 | A | | 7/1968 | Meyer et al. |
| 4,108,493 | A | | 8/1978 | Naus |
| 4,195,882 | A | | 4/1980 | Daswick et al. |
| 4,634,176 | A | * | 1/1987 | Scott ........................... 297/284.5 |
| 5,108,150 | A | | 4/1992 | Stas et al. |
| 5,154,477 | A | * | 10/1992 | Lacy .............................. 297/397 |
| 5,211,696 | A | * | 5/1993 | Lacy .............................. 297/397 |
| 5,567,015 | A | * | 10/1996 | Arias ............................. 297/397 |
| 5,803,542 | A | * | 9/1998 | Insausti ......................... 297/256 |
| 6,079,784 | A | * | 6/2000 | Peachey ...................... 297/284.5 |
| 6,305,749 | B1 | * | 10/2001 | O'Connor et al. ............. 297/397 |
| 6,513,781 | B1 | * | 2/2003 | Meyer et al. .................. 248/544 |
| 6,648,416 | B2 | * | 11/2003 | O'Connor et al. ............ 297/397 |
| 6,893,095 | B2 | | 5/2005 | Schambre et al. |
| 7,178,874 | B2 | * | 2/2007 | Demski .......................... 297/391 |
| 2015/0015047 | A1 | * | 1/2015 | Uebelacker ................... 297/383 |

FOREIGN PATENT DOCUMENTS

| | | |
|---|---|---|
| DE | 7228055 | 11/1972 |
| DE | 2644485 | 4/1978 |
| DE | 30 46 049 A1 | 7/1982 |
| DE | 41 26 518 A1 | 2/1993 |
| DE | 4215628 | 11/1993 |
| DE | 4405397 | 3/1995 |
| DE | 199 37 378 C1 | 7/2000 |
| DE | 19920220 | 11/2000 |
| DE | 20307102 | 10/2003 |
| DE | 69913203 | 9/2004 |
| DE | 60116924 | 11/2006 |
| DE | 102006028453 | 12/2007 |
| DE | 102007044319 | 7/2008 |
| DE | 10 2007 012 133 A1 | 9/2008 |
| DE | 202007016357 | 3/2009 |
| DE | 102010009526 | 8/2011 |
| DE | 102011055895 | 6/2013 |
| EP | 0972671 | 1/2000 |
| EP | 2599658 | 6/2013 |
| FR | 2748432 | 11/1997 |
| FR | 2895336 | 6/2007 |
| FR | 2 927 855 A1 | 8/2009 |
| FR | 2 930 208 A1 | 10/2009 |
| FR | 2929185 | 10/2009 |
| FR | 2932429 | 12/2009 |
| GB | 2277869 | 11/1994 |
| GB | 2 453 165 A | 4/2009 |
| WO | WO 03/068556 A1 | 8/2003 |
| WO | WO 2011/020919 A1 | 2/2011 |

OTHER PUBLICATIONS

U.S. Appl. No. 13/691,055, Buehlmeyer et al.
Examination Report for German Patent Application No. 102010018822.0, dated Jan. 31, 2013, 3 pages.
Examination Report prepared by the German Patent Office for Application No. 10 2011 055 895.0, dated Feb. 29, 2012.
Examination Report prepared by the German Patent Office for Application No. 10 2011 055 895.0, dated Oct. 2, 2012.
Official Action (no English translation available) for German Patent Application No. 102013110445.2 dated Mar. 10, 2014, 3 pages.
Official Action (no English translation available) for German Patent Application No. 102013110448.7 dated Mar. 10, 2014, 3 pages.
Official Action (no English translation available) for German Patent Application No. 102013110416.9 dated Mar. 7, 2014, 3 pages.
Extended European Search Report for European Patent Application No. 12194405.2, mailed Feb. 8, 2013, 3 pages.
Extended European Search Report for European Patent Application No. 12194557, mailed Feb. 7, 2013, 3 pages.
Examination Report for German Patent Application No. 102011055897.7, dated Feb. 27, 2012, 3 pages.
Official Action for German Patent Application No. 102012104184.9 dated Jan. 21, 2013, 3 pages.
Official Action for U.S. Appl. No. 13/686,409 mailed Apr. 24, 2014, 12 pages.

\* cited by examiner

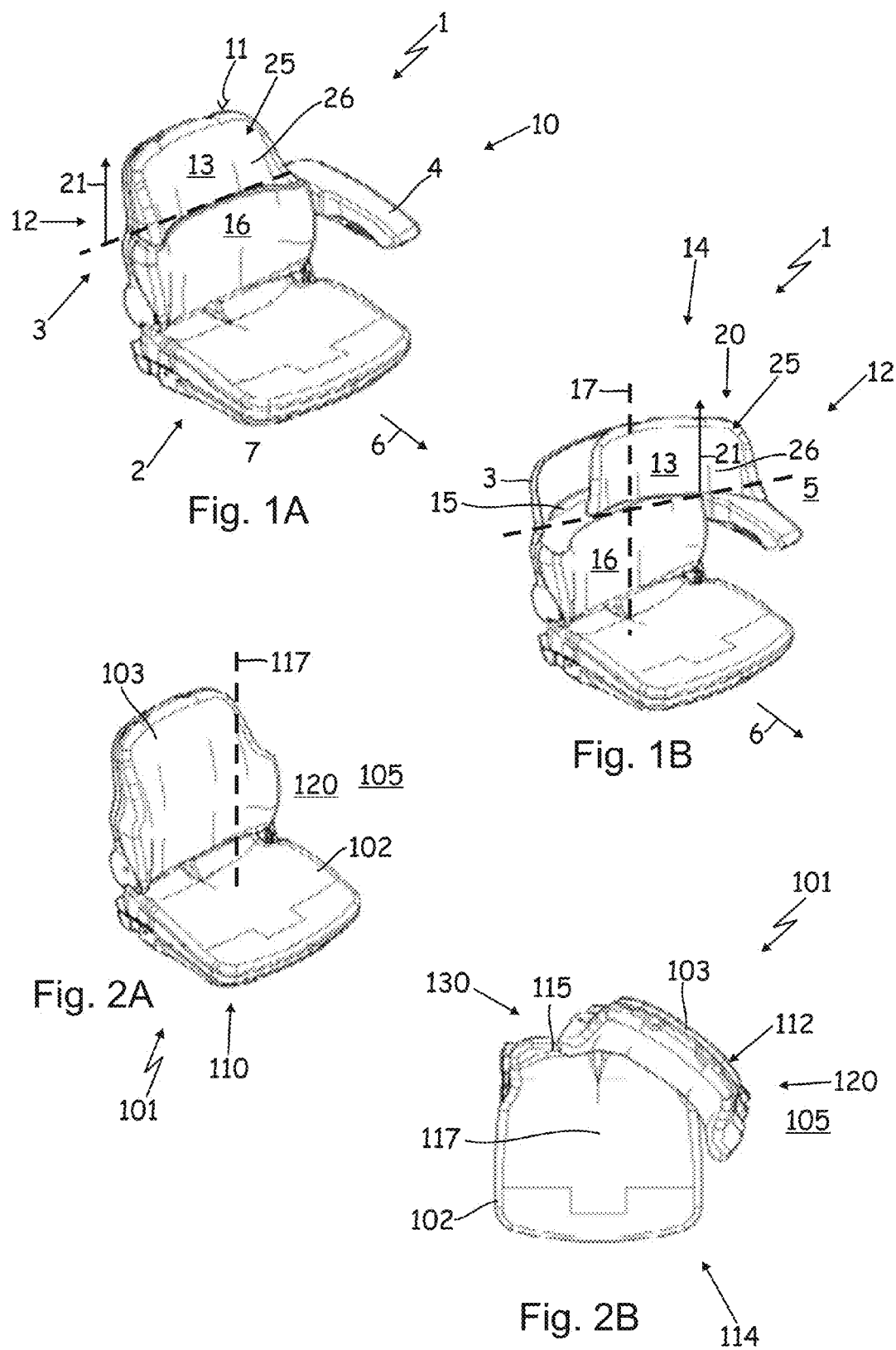

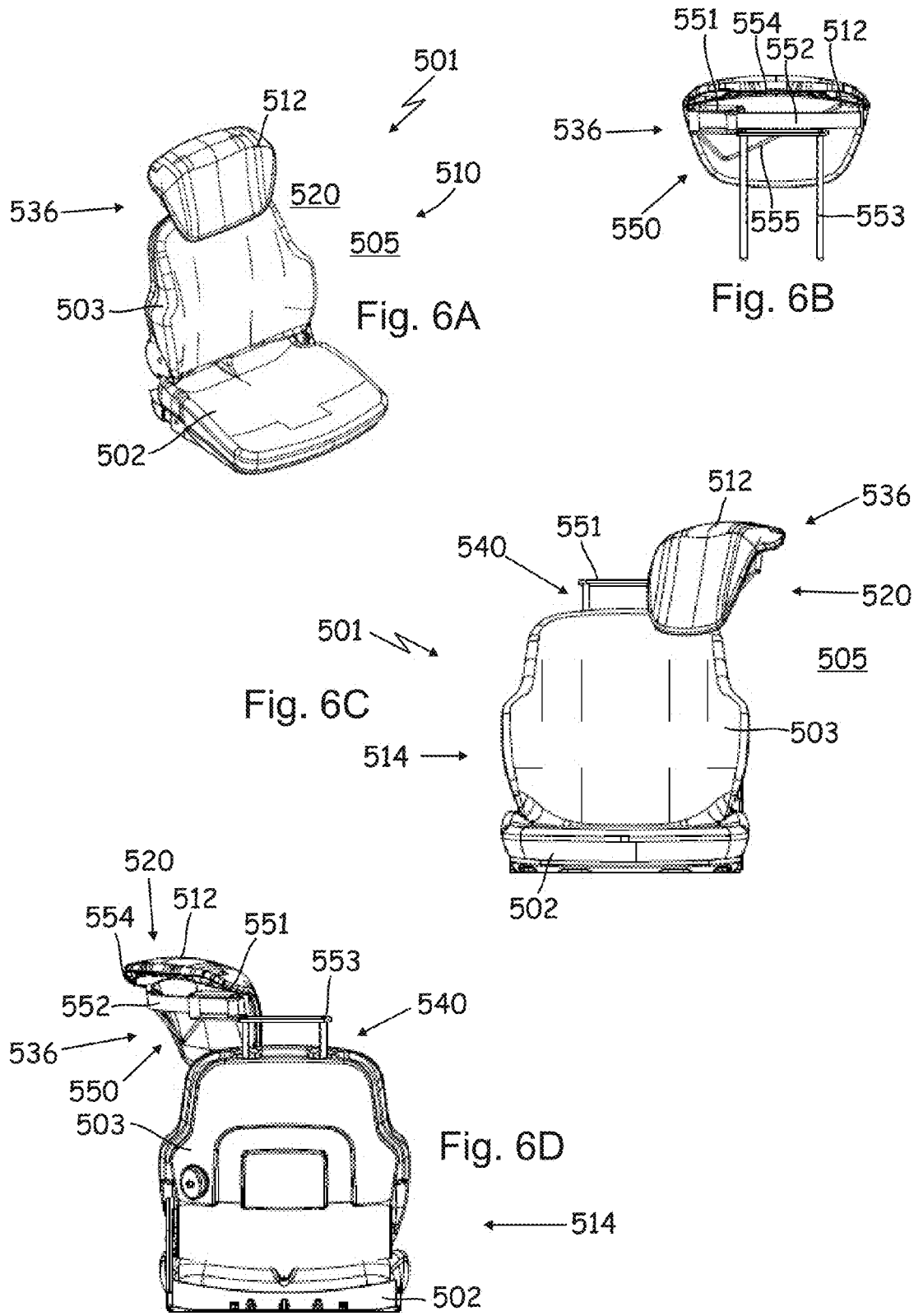

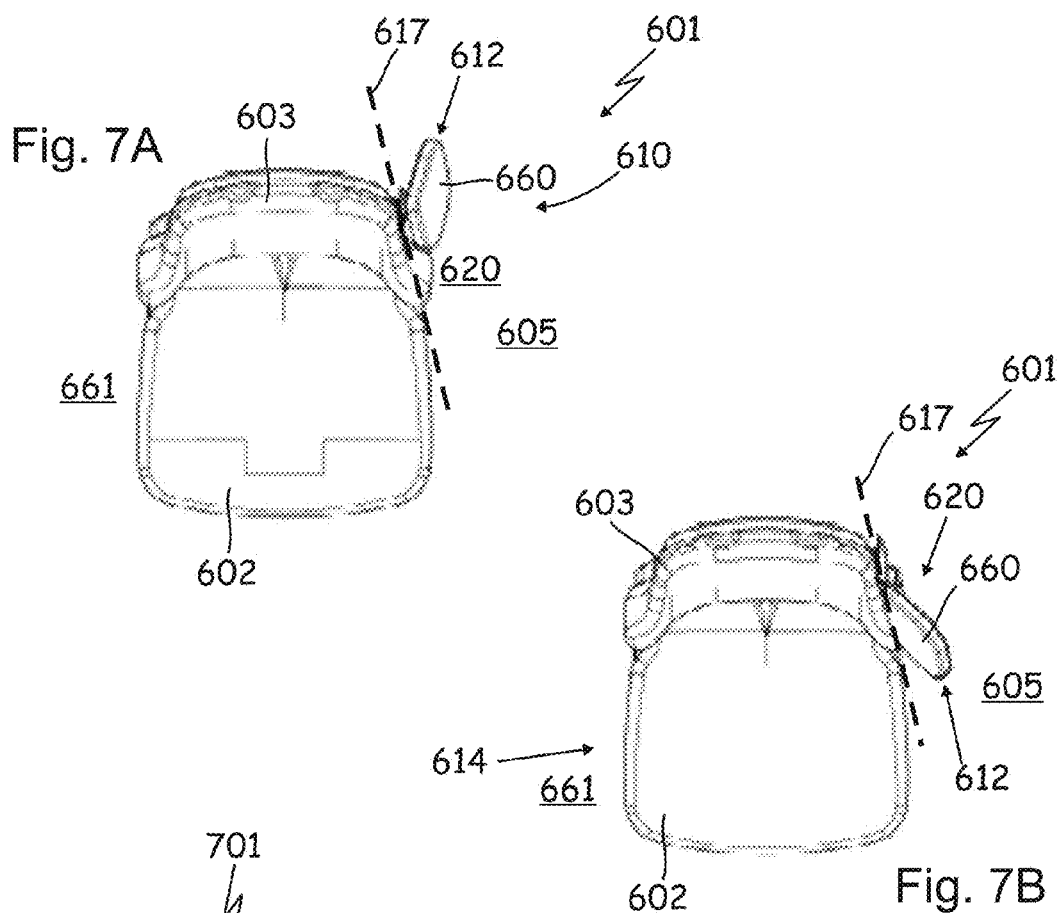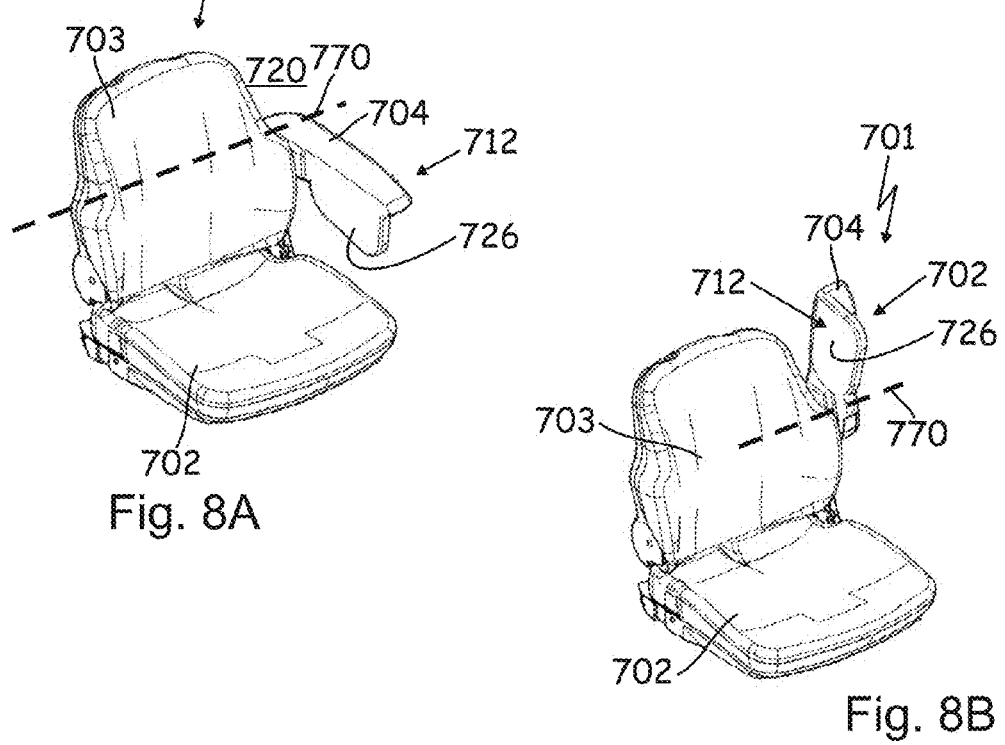

VEHICLE SEAT WITH LATERAL SUPPORT ELEMENT

CROSS REFERENCE TO RELATED APPLICATIONS

This application claims the benefit of German Application No. 10 2011 055 895.0, filed Nov. 30, 2011, the entire disclosure of which is incorporated herein by reference.

BACKGROUND OF THE INVENTION

The invention relates on the one hand to a vehicle seat with a seat part and with a seat back part for supporting a driver of the vehicle in his sitting position on the vehicle seat.

On the other hand the invention relates to a commercial vehicle, in particular an agricultural commercial vehicle, with a vehicle seat.

Furthermore, the invention relates to a method of supporting a vehicle occupant on a vehicle seat with a seat part and with a seat back part while the occupant temporarily adopts a driving/working position in which the occupant adopts or has adopted a sitting posture oriented sideways or backwards.

Moreover, the invention relates to use of a seat back part of a vehicle seat. The invention also relates to use of a seat back extension device of a vehicle seat. The invention also relates to use of a pivotable arm rest device.

Generic vehicle seats in particular for commercial vehicles and especially for agricultural commercial vehicles are well known in many forms from the prior art.

In particular, while working with these agricultural commercial vehicles and working equipment attached thereto drivers of agricultural commercial vehicles often adopt over a relatively long period of time a seated working posture which is oriented sideways or backwards, in contrast to the normal posture facing forwards in the driving direction, in order for example to be able to reach better and to operate operating elements disposed at the back of the vehicle cab, or also in order to have a good view for a relatively long period of time of a working device attached behind the agricultural commercial vehicle.

Currently a vehicle driver can swivel the entire vehicle seat, that is to say substantially the entire rigid seat construction together with the seat part and the seat back part, with the aid of a rotary adapter about a defined vertical axis of rotation. In this case the seat part remains stationary in relation to the seat back part. On the one hand this results in the driver of the vehicle having to turn out of a comfortable upholstered seat contour of the vehicle seat in order in particular to be able to actuate the pedals of the agricultural commercial vehicle somewhat better. This can lead to pressure sores and thus to discomfort especially in the buttocks and thigh area of the driver of the vehicle.

Any accessories on the vehicle seat, for example a multifunction armrest, likewise rotate in relation thereto. Operating levers which are disposed further back and to the side still cannot always be actuated comfortably.

The upholstered backrest contour is currently shaped in such a way that the driver of the vehicle has the maximum possible support when in the forward facing seated working posture without taking the necessary degrees of freedom required for his movements when driving. In order not to impede freedom of movement in the shoulder and arm region, the backrest cushion of the seat back part should not be contoured too strongly in the upper region. However, in order to ensure good support and thus a sufficiently good relief of the strain on the driver, the support surface should be as large as possible in all driving positions. At present, for the reasons mentioned above, such as the necessary degrees of freedom for good movement, this can only be achieved to some extent.

A further disadvantage is that the swivel range of the rotary adapter is limited by the fact that in spite of watching the working equipment behind the commercial vehicle, the vehicle must also be safely controlled by means of the pedals and the steering wheel. In order to meet these requirements the driver of the vehicle must adopt an enforced posture which inevitably leads to twisting of the entire body. Scientific studies show that such a twisted enforced posture in particular with vibrational stresses can lead to damage to the body structures, especially when the body is not sufficiently well supported. It is also established that the strain on the spinal column can be significantly reduced by good support by means of the seat back part.

SUMMARY OF THE INVENTION

The object of the invention is to offer the driver of a vehicle improved seating comfort and significant relief of stress on the body structures in order to be able to operate and in particular to drive an agricultural commercial vehicle more.

The object of the invention is achieved by a vehicle seat with a seat part and with a seat back part for supporting a driver of the vehicle in his sitting position on the vehicle seat, wherein the vehicle seat is distinguished by an additional vehicle driver's torso support device which can be disposed outside the seat part and the seat back and which can be temporarily disposed at least partially in an otherwise seat-free torso support region at the level of or above the upper third of the seat back part in front of the seat back part and laterally off-centre on the seat back part, in order to provide support, laterally off-centre of the seat back part, at least at the level of the shoulder or chest region of the driver who is sitting on the vehicle seat when he adopts a seated working posture oriented to the side or backwards, wherein the additional vehicle driver's torso support device is disposed so as to be movable by a moving device from a parked position into an additional torso support position in the otherwise seat-free torso support region.

When the vehicle driver adopts an enforced posture, in particular the seated working position described above in which he is oriented to the side or backwards, extraordinarily good relief from strain can be provided advantageously by the additional vehicle driver's torso support device disposed in this way. Furthermore, the additional vehicle driver's torso support device is preferably available only when needed. Otherwise, for instance in a forward facing driving position, the additional vehicle driver's torso support does not interfere, since it remains in its rest position or established parked position respectively.

Advantageously, the additional vehicle driver's torso support device can be disposed in such a way that while the driver sitting on the vehicle seat adopts a seated working posture oriented to the side or backwards he is supported, laterally off-centre of the seat back part, at least at the level of his shoulder or chest region.

Within the meaning of the invention the expression "additional vehicle driver's torso support device" describes a device for additional torso support for the driver of the vehicle while in an enforced posture on the vehicle seat.

In the present context the term "torso" describes anatomically the central region of a human body, and the torso encompasses the chest, the abdomen, the back and the pelvis of the human body.

In this respect the seat may also be supplemented or already provided, cumulatively or alternatively, with in particular an arm rest device on which the driver of the vehicle could of course also support himself in any way while in an enforced posture. However, support on an arm rest device can only take place in the driver's pelvic region. However, for a relatively long period of time this is not comfortable and moreover is ergonomically insufficient. In order to produce significant relief of stress on the body structures an available contact surface must go beyond the currently existing arm rest devices.

In this respect it is advantageous if the additional vehicle driver's torso support comprises a contact surface for the vehicle driver's back and/or shoulder region, wherein the contact surface is advantageously ergonomically shaped so as to correspond particularly well to the human body anatomy. This encourages the driver of the vehicle to accept such an additional torso support and to use it frequently. In particular, the driver's body is well protected by such a contact surface against injuries, since especially when this is used in agricultural commercial vehicles working on the land the going is often very rough and in this case the driver of the vehicle is grateful for any targeted torso support.

The additional vehicle driver's torso support device may be disposed or fastened on almost any location in a vehicle cab. It is preferably disposed directly on the vehicle seat, such as for example on a fixed base and mounting structure, a seat part or a seat back part of the respective vehicle seat.

Within the meaning the invention the expression "seat-free torso support region" describes a region on the vehicle seat in which it is not sensible for permanent support devices for the vehicle seat to be permanently disposed, since in normal driving operation this would be very disruptive to the driver of the vehicle. In this case the present seat-free torso support region is located on the one hand substantially in the upper third of the seat back part, that is to say more than halfway up the seat back part, and thus in the direct visual range of the vehicle driver to the side of or behind his immediate visual range. It may also be located above the upper third. For this reason alone this seat-free torso support region should be kept absolutely free at least in normal forward driving operation. Accordingly, it should not be confused with a conventional support region in which an arm rest device, on which the driver of the vehicle can then rest his arm for relief of stress, can be pivoted in temporarily. On the other hand, within the meaning of the invention the seat-free torso support region is located off-centre of the seat back part. Just for this reason it should not be confused with a conventional support region in which a head rest device is placed, nor since the seat-free torso support region is also disposed in front of the seat back part and to the side thereof. In this respect the present seat-free torso support region is also provided to the side and above the seat part of the vehicle seat.

The description "seated working posture oriented to the side or backwards" in this case describes an enforced posture of the driver of the vehicle relative to a rotation of the upper body, in order in this case to be better able to watch a rear working area, in particular behind the agricultural commercial vehicle.

It should be pointed out here that the vehicle seat according to the invention can be used not only with regard to a driver of the vehicle. Instead, the vehicle seat according to the invention can be used in almost any field of application, in which an additional torso support device is to be provided at least temporarily in the surroundings of the vehicle seat.

The additional vehicle driver's torso support can be moved in particularly stable manner from the parked position into the additional torso support position when the moving device has means for rotationally and/or translationally moving the additional vehicle driver's torso support device.

The object of the invention is also achieved by a method of supporting a vehicle driver on a vehicle seat with a seat part and with a seat back part while he is in a temporarily adopted driving/working position, wherein the vehicle driver adopts or has adopted a seated working posture oriented to the side or backwards, wherein an additional vehicle driver's torso support device is temporarily moved into the vicinity of the vehicle seat in order to provide support, to the side of the seat back part, at least at the level of the driver's shoulder or chest region while he is in a sitting posture oriented to the side or backwards, and wherein for this purpose the additional vehicle driver's torso support device is moved out of a parked position into an otherwise seat-free torso support region in front of the seat back part and/or to the side of the seat back part and at the level of or above the upper third of the seat back part.

Advantageously, the additional vehicle driver's torso support device may be provided only as required and temporarily on the vehicle seat, so that the surroundings of the vehicle seat are not occupied by additional devices if these are not needed.

The additional vehicle driver's torso support device can be used particularly easily if it is disposed on the seat back part so that it can be actuated by means of a pressure-actuated device on an upholstered part of the seat back part. In this way the additional vehicle driver's torso support device can automatically follow the movements of the driver of the vehicle, so that the driver of the vehicle is relieved of stress particularly well in his multiplicity of tasks since he does not have to actuate an additional operating element.

An advantageous modification of the present invention may be achieved if the seat part, the seat back part and a head rest part form a main outer contour of the vehicle seat, and the additional vehicle driver's torso support device is retained on the seat back part so that it can be temporarily disposed outside the main outer contour.

When the additional vehicle driver's torso support is not being used it may advantageously be located behind the main outer contour or delimit and configure this, so that especially in normal forward driving operation, in which the driver of the vehicle adopts a forward facing driving position, it does not interfere in the surroundings of the seat area or of the vehicle seat. In this respect all-round visibility on the agricultural commercial vehicle is not negatively restricted, which is of considerable importance with regard to traffic safety, but also to safety at work, since in this way it is possible to prevent accidents with persons located in the working range of the agricultural commercial vehicle.

Already on the basis of the above-mentioned advantages the object of the invention is also achieved by a commercial vehicle, in particular by an agricultural commercial vehicle, which is distinguished by a vehicle seat for a driver of the vehicle according to one of the features described here. By means of a commercial vehicle, in particular an agricultural commercial vehicle, equipped with the vehicle seat according to the invention a driver of the vehicle is supported or protected in terms of his health much better than was possible in the past.

Furthermore, a particularly advantageous variant provides that the vehicle seat has, in addition to a normal support operating state, at least one special support operating state in which the additional vehicle driver's torso support device can be disposed in front of the seat back part and temporarily delimits a free space for driver movement located above and/or to the side of the seat part.

Within the meaning of the invention temporarily an advantageous additional vehicle driver's torso support device can be temporarily provided by the delimited free space for driver movement, in order to relieve the vehicle driver of stress advantageously with regard to an adopted enforced posture.

Within the meaning of the invention the term "normal support operating state" describes an operating state on the vehicle seat in which the additional vehicle driver's torso support device is inactive and therefore is not available for additional torso support in the otherwise seat-free support region.

In the present case the term "special support operating state" describes a further operating state on the vehicle seat which deviates from the normal support operating state and in which the additional vehicle driver's torso support device is active, in other words an operating state in which the vehicle driver's torso support device is disposed in the otherwise seat-free support region and is available for an additional body torso support.

It will be understood that the additional vehicle driver's torso support device can be fastened to different fastening locations in a vehicle cab in particular of an agricultural commercial vehicle. However, in order that the surrounding cab area is not obstructed by the additional vehicle driver's torso support device it is particularly advantageous if the additional vehicle driver's torso support device is disposed on the seat back part.

If the additional vehicle driver's torso support device is disposed so that it can be actuated interactively dependent upon the body posture, it can be activated extraordinarily simply without the driver of the vehicle having to manually actuate operating elements for activating the additional vehicle driver's torso support device.

In this case the expression "dependent upon the body posture" describes the advantageous activation or actuation of the additional vehicle driver's torso support device respectively by simple movement of the body in the vehicle seat or in the upholstered parts thereof respectively.

This is for example in order to trigger pressure sensors which, for instance within the seat back part, detect a pressure load or a change of pressure load respectively on the vehicle seat by the driver of the vehicle. In the case of a certain pressure pattern the additional vehicle driver's torso support device can then be activated and moved from a parked position into the otherwise seat-free torso support region.

In this respect, a further advantageous variant provides that the vehicle seat has on the seat back part an interactive actuating device which is dependent upon the vehicle driver's posture, wherein the additional vehicle driver's torso support device is disposed on the seat back part so that it can be actuated by means of a pressure-actuated device on an upholstered part of the seat back part.

Advantageously, a body posture or a change of body posture can also be monitored cumulatively or alternatively by a vehicle seat environment recognition system, in order then in the case of a certain behaviour pattern to anticipate an imminent body posture and to initiate activation of the additional vehicle driver's torso support device in good time.

It will be understood, that for such an interactive actuation many more technical implementation options can be employed.

For example the body position can also be detected by means of a preferable force sensor or a capacitive sensor or sensors which operate in other ways, which can detect a change in posture of the driver of the vehicle. As soon as the system recognises the change in posture, the vehicle seat changes its support surfaces within the meaning of the invention.

It will be understood, furthermore, that a movement of the additional vehicle driver's torso support device can take place mechanically, hydraulically, pneumatically or even by means of electric motors, depending upon which technical prerequisites are available on the respective commercial vehicle.

In this respect a preferred variant of the method also provides that the additional vehicle driver's torso support device is moved automatically, depending upon the vehicle driver's body posture, into the torso support region. Advantageously, this entirely rules out the possibility of the driver of the vehicle being unnecessarily distracted from his work by operating an actuating device of the additional vehicle driver's torso support device.

Furthermore, for the sake of completeness it may be mentioned at this point that alternatively an activation of the additional vehicle driver's torso support device can also be initiated manually, as in fact an operating device can be invariably or alternatively actuated by hand.

It will be understood that the additional vehicle driver's torso support device can be realised in structurally diverse ways. However, it has been shown in the past that it is particularly advantageous if the additional vehicle driver's torso support device is implemented with the aid of a component or an accessory of the seat back part.

In this respect the object of the invention is also achieved by the use of a seat back part of a vehicle seat at least partially as a vehicle driver's torso support device which can be moved temporarily into an otherwise seat-free torso support region at the level of or above the upper third of the seat back part in front of the seat back part and laterally off-centre on the seat back part, in order to provide support, to the side of the seat back part, for a vehicle driver sitting on the vehicle seat at least at the level of his shoulder region while he is in a seated working posture oriented to the side or backwards.

Advantageously, specially configured regions of the seat back part can be used as the additional vehicle driver's torso support device.

Furthermore, the invention is also achieved by the use of a seat back extension device of a vehicle seat at least partially as a vehicle driver's torso support device which can be moved temporarily into an otherwise seat-free torso support region at the level of or above the upper third of the seat back part in front of the seat back part and laterally off-centre on the seat back part, in order to provide support, to the side of the seat back part, for a vehicle driver sitting on the vehicle seat at least at the level of his shoulder and/or chest region while he is in a seated working posture oriented backwards.

Within the meaning of the invention the expression "seat back extension device" describes an upper part of the seat back part, by means of which the driver of the vehicle can be supported substantially in the region of his torso.

With regard to another possibility for implementation of the present additional vehicle driver's torso support device, the object of the invention is also achieved by the use of a pivotable arm rest device of a vehicle seat at least partially as a vehicle driver's torso support device which can be moved temporarily into an otherwise seat-free torso support region at the level of or above the upper third of the seat back part in front of the seat back part and laterally off-centre on the seat back part, in order to provide support, to the side of the seat back part, for a vehicle driver sitting on the vehicle seat at least at the level of his shoulder and/or chest region while he is in a seated working posture oriented backwards.

Also within the meaning of the invention an arm rest device may advantageously be equipped with a contact surface and thus with a very simple design can provide an additional vehicle driver's torso support device.

In particular by means of the present invention a vehicle or passenger seat with a variably adaptable upholstered back part can be provided, in order to be able advantageously to support a plurality of postural positions of the driver. In this respect it is advantageous if the present additional vehicle driver's torso support device is an integral component of the seat back part.

The upholstered back part is preferably distinguished by the fact that it supports at least two different driving positions, namely firstly driving straight ahead and secondly driving with a twisted upper body, in order for example to observe attached equipment behind the agricultural commercial vehicle or to better reach operating elements disposed at the side or also simply only to adopt a relaxed and comfortable sitting position without in this case disadvantageously restricting the driving of the agricultural commercial vehicle, as has frequently been the case in the past. All the vehicle driver sitting positions in between can of course also be advantageously supported by the present additional vehicle driver's torso support device. This may advantageously be achieved for instance by variably adjustable elements of the upholstered back part, the seat back extension device or additional elements which are attached thereto or to the seat back part respectively and which can move and/or alter between the two driving positions in such a way that ideally maximum support is provided in all body postures of the driver of the vehicle without impairing the respective other body posture.

Furthermore the invention is also distinguished by the fact that on the one hand it prevents the disadvantage of the previously used rotary adapter in particular with regard to of the otherwise twisted upholstered seat part. The upholstered seat part preferably remains in its original established position, that is to say it does not rotate about a vertical axis, and thus it can also provide optimal support for the driver's buttocks or lower body. A slight swiveling movement of the vehicle seat or of the upholstered seat part respectively are optionally allowed if this is desirable in order to be able to reduce the degree of twisting or torsion respectively of the driver's upper body. In this way the present invention can be developed well further. The position of the driver with respect to the pedals and the steering wheel changes advantageously but also in this case hardly at all or only to an insignificant extent respectively. In this respect, the agricultural commercial vehicle can then be operated and steered sensibly and particularly safely. As already mentioned in the introduction, the driver of the vehicle does not suffer any pressure sores or significant feelings of discomfort because of unfavourable twisting of the upholstered seat part under the buttocks, as has often been the case in the past. Since the contact of the legs or the feet respectively with the pedals can remain almost unchanged, there is no critical impairment of the vehicle operation. The seat back part, the back extension device or additional elements thereof which provide a functional back support advantageously adjust very well to both the anthropometry and the respective working task of the vehicle driver. All positions of the driver can be optimally supported by the additional vehicle driver's torso support device which is proposed within the meaning of the invention. Above all, with regard to the seated working posture oriented backwards an almost optimal torso support of the driver's upper body can be achieved in particular by a back extension device which can for example be pivoted laterally inwards.

An alternative torso support can be provided ideally by a left arm rest device which is optimised for comfort and which has on its inner face, that is to say a face which faces the driver of the vehicle, an additional contour or contact surface respectively which is adapted to the anthropometry of the driver. In this way in all significant driving positions an almost maximum support surface can be achieved for additional support of the driver's torso. As a result the strain of the driver of the vehicle is significantly reduced. Since the body itself can be substantially better supported in enforced positions, the driver of the vehicle maintains his performance over a significantly longer period of time. Moreover, it is known that a maximum torso support for the body by the upholstered backrest advantageously reduces the stress on the spinal column. Furthermore, a good torso support prevents a loss of control of the vehicle due to a lack of support surfaces for a driver of the vehicle. Moreover, the driver of the vehicle is advantageously offered the possibility of adopting different and sensibly supported body postures particularly easily and comfortably, which is an important prerequisite for long periods of driving without an excessive drop in performance and also reduces the health risk when working for long periods in an enforced posture. A further particularly important advantage of the invention resides in the unusually user-friendly ease of operation. An automatic adaptation of the vehicle seat to different body postures is extraordinarily important in order to save the driver of the vehicle in particular from having to carry out distracting adjustments in relation to an obliging and more comfortable vehicle seat position while he is driving. Health-promoting functions should as far as possible be carried out automatically, since when the driver of the vehicle is carrying out the individual driving tasks he is in any case already subject to a very high operational workload. Adjustments, which do not directly belong to the driving task or are not absolutely necessary respectively are often neglected and not carried out or carried out too late.

It will be understood that for the present invention there are a large number of different approaches to a solution. First substantial and advantageous variants are explained below.

BRIEF DESCRIPTION OF THE DRAWINGS

Further advantages, aims and characteristics of the present invention are explained with reference to the appended drawings and the following description in which several vehicle seats are illustrated and described by way of example with first possible variants of an embodiment relating to an additional vehicle driver's torso support device. In the drawings:

FIG. 1A shows schematically a perspective view of a vehicle seat located in a normal support operating state with a seat part, with a seat back and with an arm rest device, wherein an upper upholstered element of the seat back part comprises a movable additional vehicle driver's torso support device;

FIG. 1B shows schematically a further perspective view of the vehicle seat of FIG. 1A in a special support operating state with the additional vehicle driver's torso support device moved laterally out of the seat back part;

FIG. 2A shows schematically a perspective view of a further vehicle seat located in a normal support operating state with a seat part, with a seat back part which can swivel laterally with respect thereto, wherein the entire seat back part forms a movable additional vehicle driver's torso support device;

FIG. 2B shows schematically a further perspective view of the vehicle seat of FIG. 2A in a special support operating state with the additional vehicle driver's torso support device moved laterally out of the seat back part;

FIG. 6A shows schematically a perspective view of a vehicle seat located in a normal support operating state, with another back extension device configured as an additional vehicle driver's torso support device;

FIG. 6B shows schematically a rear detail view of the back extension device of FIG. 6A comprising the additional vehicle driver's torso support device;

FIG. 6C shows schematically a front view of the vehicle seat of FIGS. 6A and 6B in a special support operating state;

FIG. 6D shows schematically a rear view of the vehicle seat of FIGS. 6A and 6C in the special support operating state;

FIG. 7A shows schematically a plan view of another vehicle seat located in a normal support operating state, with an additional pivotable vehicle driver's torso support device which is externally disposed laterally on a seat back part;

FIG. 7B shows schematically a plan view of the vehicle seat of FIG. 5A in a special support operating state with the additional vehicle driver's torso support device pivoted in an otherwise seat-free torso support region;

FIG. 8A shows schematically a perspective view of a vehicle seat located in a normal support operating state, with an arm rest device comprising an additional vehicle driver's torso support device;

FIG. 8B shows schematically a further perspective view of the vehicle seat of FIG. 8A in a special support operating state;

DETAILED DESCRIPTION

Figure 3A:
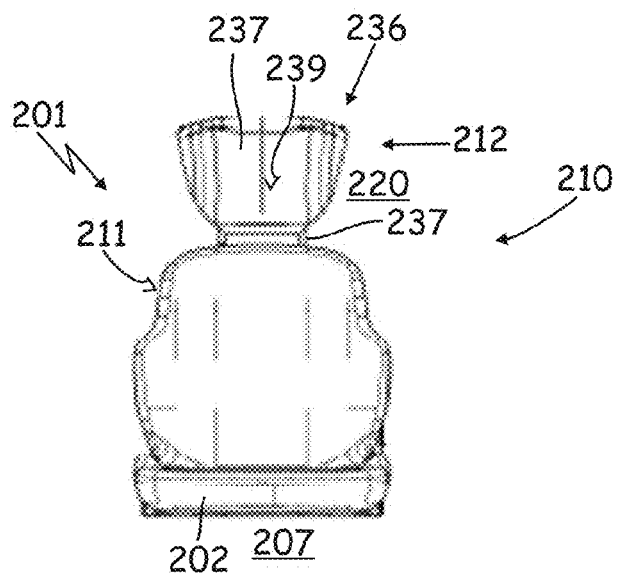
FIG. 3A shows schematically a front view of a vehicle seat located in a normal support operating state with a seat part, with a seat back part, with an arm rest device and with an additional vehicle driver's torso support device comprising a seat back part extension device disposed above the seat back part.

The vehicle seat 1 shown in FIGS. 1A and 1B is installed in an agricultural commercial vehicle not shown in greater detail here. The vehicle seat 1 primarily has a seat part 2, a seat back part 3 and an arm rest device 4 which is fastened on the left side 5 of the vehicle seat 1 when viewed in the forward travel direction 6 of the agricultural commercial vehicle. The vehicle seat 1 is fastened with the underside 7 of its seat part 2 by means of a bracket on a cab floor (not shown here) of the agricultural commercial vehicle. If appropriate, the bracket may comprise a spring device for spring mounting of the vehicle seat.

According to the illustration in FIG. 1A, the vehicle seat 1 is located in a normal support operating state 10, in which a driver of the vehicle (not shown here) is sitting on the vehicle seat 1 in a forward driving position and facing forwards. In this normal support operating state 10 the seat part 2, the seat back part 3 and the arm rest device 4 form a main outer contour 11 on which the driver of the vehicle can be supported.

According to the invention the vehicle seat 1 has an additional vehicle driver's torso support device 12 which can be disposed outside the seat part 2, the seat back part 3 and the arm rest device 4.

In this first embodiment the additional vehicle driver's torso support device 12 comprises an upper upholstered part element 13 which can move laterally to the left 5 out of the seat back part 3 in translation along a curved device 15 (see FIG. 1B) during a special support operating state 14 (see FIG. 1B).

By contrast, a lower upholstered part element 16 disposed below the upper upholstered part element 13 is disposed jointly with the seat back part 3 so as to be substantially non-rotatable relative to the seat part 2, so that in contrast to the additional vehicle driver's torso support device 12 it is not mounted on the seat back part 3 so as to be pivotable about a vertical axis 17.

According to the invention, the additional vehicle driver's torso support device 12 is disposed at least partially in an otherwise seat-free torso support region 20 at the level of or above an upper third of the seat back part 21 in front of the seat back part 3 when the special support operating state 14 is temporarily set. At the same time the additional vehicle driver's torso support device 12 is located to the side of the seat back part 3 and thus also above and to the side of the seat part 2.

In this respect while the driver sitting on the vehicle seat 1 adopts a seated working posture oriented to the side or backwards he can be provided with additionally targeted support, laterally off-centre of the seat back part 3, at least at the level of his shoulder or chest region, so that especially in this enforced posture is particularly advantageously supported by the additional vehicle driver's torso support device 12. This was not possible in the past.

For this purpose the additional vehicle driver's torso support device 12 has, on a side 25 facing the driver of the vehicle, an additional contact surface 26 in the otherwise seat-free torso support region 20 for the driver of the vehicle.

Operation or respectively activation of the additional vehicle driver's torso support device 12 takes place in this case automatically and interactively by means of a bodily force exerted on the seat back part 3 and thus advantageously without an additional manually initiated actuation of operating elements.

In addition to the variant described above, the seat back part 3 can also be divided differently in order to configure the additional vehicle driver's torso support device 12 advantageously. For example, an alternative seat back part 3 for use in this connection has an additional vehicle driver's torso support device 12, in which a plurality of upholstered back part elements (not shown here) movable in segments relative to one another are retained on the seat back part 3, for instance four upholstered back part elements, for example top left, bottom left and top right and bottom right, which ideally variably relative to one another can change position with respect to the seat back part 3. Such variably movable upholstered back part elements of an additional vehicle driver's torso support device 12 can also produce almost any different division of a upholstered set back part 3. For example, such a division may also be oblique, vertical or may take place at different levels on the seat back part 3. Furthermore, it is possible for only a part-region to be moved out of the middle of the upholstered back part as an additional vehicle driver's torso support device 12 within the meaning the invention. An upper and lower upholstered back part remain immovably on the seat back part 3.

In the vehicle seat 101 shown in FIGS. 2A and 2B for an agricultural commercial vehicle (not shown here) a seat back part 103 is advantageously is mounted entirely on a curved device 115 so as to be pivotable outwards and to the left 105 about a vertical axis 117 relative to a seat part 102, so that in a special support operating state 114 (see FIG. 2B) of the vehicle seat 1 according to the invention, by comparison with a hitherto customary normal support operating state 110 (see FIG. 2A) of the vehicle seat 1, an additional vehicle driver's torso support device 112 with a particularly large surface area can be provided in an otherwise seat-free torso support region 120 in order to support a driver of the vehicle. Because in this case the visual range 130 is now clear, it is possible to have a particularly good view backwards for example of working equipment towed behind an agricultural commercial vehicle. In this variant a variably adjustable entire seat back part 3 or also only an entire upholstered part element 131 thereof are provided as the additional vehicle driver's torso support device 112. Operating is preferably performed automatically only by means of bodily force without actuation of an operating element or, as required for instance according to customer requirements, alternatively on the basis of a manually actuated operating element. A solution would also be conceivable in which a seat back part is rotatably mounted and in addition is flexibly configured in the longitudinal plane, so that it can adapt automatically to the movement and contour of the driver's back.

The vehicle seat 201 illustrated in FIGS. 3A to 3C again primarily comprises a seat part 202 and a seat back part 203. Furthermore a seat back extension device 236 configured as a back support device 237 is provided at the top 235 of the seat back part 203. The vehicle seat 201 is fastened with the underside 207 of its seat part 202 by means of a bracket, which is not shown here and is optionally sprung, on a cab floor of an agricultural commercial vehicle (not shown here).

Figure 3B:
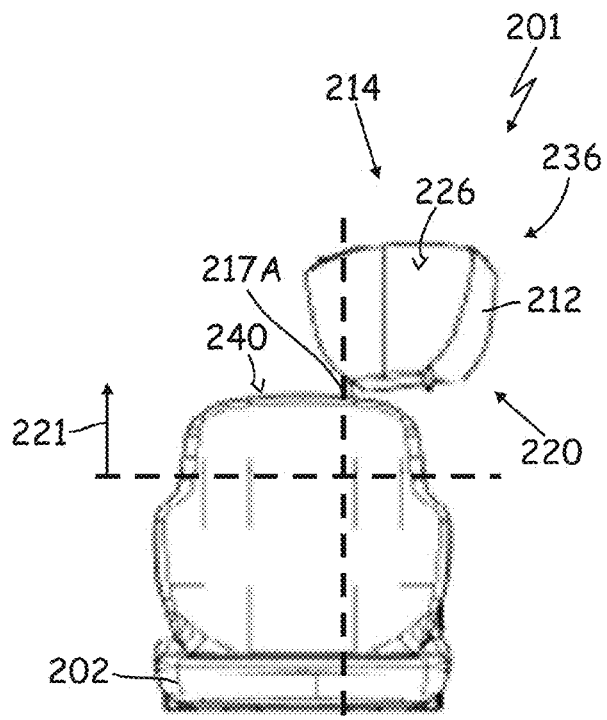
FIG. 3B shows schematically a further front view of the vehicle seat in a special support operating state with the additional vehicle driver's torso support device moved in an otherwise seat-free torso support region.

According to the illustration in FIG. 3A, the vehicle seat 201 is shown in a normal support operating state 210, in which a driver of the vehicle (not shown here) is sitting on the vehicle seat 201 in a forward driving position and facing forwards. In the normal support operating state 210 the seat part 202 and the seat back part 203 primarily form a main outer contour 211 of the vehicle seat 201 on which the driver of the vehicle can be supported.

According to the invention the vehicle seat 201 is equipped with an additional vehicle driver's torso support device 212 which can be disposed outside the main outer contour 211 and which in this embodiment is realised by the seat back extension device 236.

The seat back extension device 236 is pivotably mounted in particular on a rotary retaining element 217A on the seat back part 203, so that it is mounted pivotably about a vertical axis 217 relative to the seat back part 203.

Figure 3C:
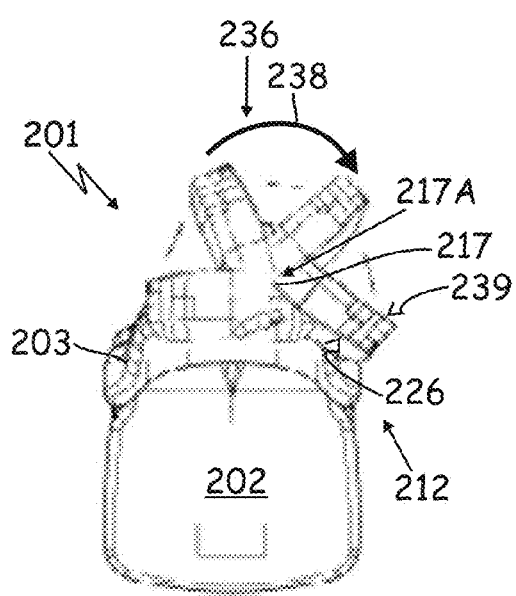
FIG. 3C shows schematically a plan view of the vehicle seat out of FIGS. 3A and 3B with illustrated adjustment path of the additional vehicle driver's torso support device.

It can be seen very well, in particular with the aid of the illustration according to FIG. 3C, how a pivoting movement takes place along an adjustment path 238 of the additional vehicle driver's torso support device 212 from the normal support operating state 210 about the vertical axis 217 to the special support operating state 214.

In its function as an additional vehicle driver's torso support device 212 the seat back extension device 236 has an additional contact surface 226 which in the normal support operating state 210 is disposed on the back of the seat back part 203. On the other hand, in the special support operating state 214 of the vehicle seat 201 it is facing the driver of the vehicle. Precisely the opposite happens with regard to a back contact surface 239. In its function as a back support device 237 the seat back extension device 236 has a back contact surface 239 which in the normal support operating state 210 is facing the driver of the vehicle. In this case the additional contact surface 226 is disposed on the rear face of the seat back part 203 and thus facing away from the driver of the vehicle.

In the special support operating state 214, according to the invention the additional vehicle driver's torso support device 212 is disposed at least partially in an otherwise seat-free torso support region 220 above an upper third of the seat back part 221 in front of the seat back part 203 and to the side of the seat back part 203. At the same time the additional vehicle driver's torso support device 212 is located at least partially to the side of the seat back part 203 and thus also above and to the side of the seat part 202. In this respect while the driver sitting on the vehicle seat 201 adopts a seated working posture oriented to the side or backwards he can be provided with additionally targeted support, laterally off-centre of the seat back part 201, at least at the level of his shoulder region, so that especially in this enforced posture he is particularly advantageously supported by the additional vehicle driver's torso support device 212.

Operation or respectively activation of the additional vehicle driver's torso support device 212 also takes place in this case automatically and interactively by means of a bodily force exerted on the seat back part 203 or on the rotatable back extension device 236 and thus advantageously without an additional manually initiated actuation of operating elements.

By means of the rotatable back extension device 236 two support contours, namely on the one hand the back contact surface 239 and on the other hand the additional contact surface 226, can be advantageously provided for optimal adaptation of contours in the two support operating states 210 and 214. In the normal operating state 210 the driver of the vehicle has an optimal back support. In this embodiment, when the driver is sitting twisted to the side the back extension device 236 as additional vehicle driver's torso support device 212 is folded back by the elbow, rotates over the left rotary retaining element 217A (see FIG. 3C) and at the side of the seat back part 203 it is forwards again into the otherwise seat-free torso support region 220 (see in particular FIG. 3B). The back extension device 236 is unlocked laterally here by means of arm pressure and is pivoted by means of a spring force approximately by 180° along the adjustment path 238. This is followed by latched adjustment options up to approximately 240°. With an overtravel of approximately 270° the additional vehicle driver's torso support device 212 falls back again into its back support function.

Operation of the additional vehicle driver's torso support device 212 can also take place by means of operating elements which are ideally disposed in a left arm rest device (not shown here). Pivoting of the back extension device 236 as an additional vehicle driver's torso support device 212 advantageously allows simultaneous use of a rear arm rest device 240 optimised for comfort in the region of the seat back part 203 (see FIG. 3B) which is now free.

Figure 4:
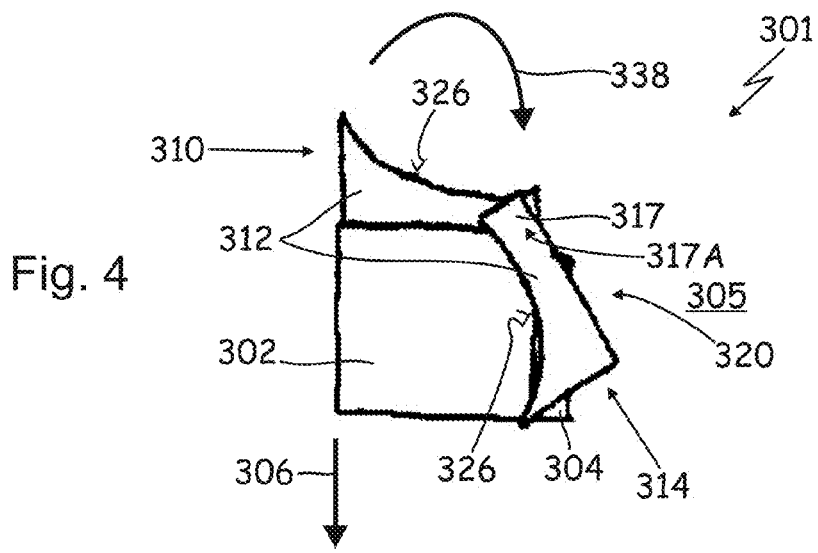
FIG. 4 shows schematically a plan view of a further additional vehicle driver's torso support device both in a normal support operating state and in a special support operating state with an additional differently configured contact surface of a similar vehicle seat as in FIGS. 3A to 3C.

The vehicle seat 301 shown in FIG. 4 for an agricultural commercial vehicle (not shown here) has a seat part 302, a seat back part which is not shown and an arm rest device 304 which is disposed on the left 305 laterally outside on the seat back part in relation to the forward driving direction 306.

According to the invention the vehicle seat 301 comprises an additional vehicle driver's torso support device 312 which is fastened on the seat back part so as to be rotatable about a vertical axis 317. In this case in a normal support operating state 310 the additional vehicle driver's torso support device 312 is disposed behind the seat part 302. In a special support operating state 314 the additional vehicle driver's torso support device 312 is advantageously moved into an otherwise seat-free support region 320 so that here too a driver of the vehicle (not shown here) sitting on the vehicle seat 301 is again advantageously supported externally off-centre to the left 305 and to the side of the seat part 302, at least at the level of his shoulder region while he is in a seated working posture oriented to the side or backwards.

For this purpose the additional vehicle driver's torso support device 312 has been moved along the adjustment path 338 from the normal support operating state 310 into the special support operating state 314. For this purpose, when the driver is sitting twisted to the side the additional vehicle driver's torso support device 312 is folded back by the elbow, rotates over the left rotary retaining element 337 and folds forwards again at the side of the seat back part into the otherwise seat-free torso support region 320. The additional vehicle driver's torso support device 312 is unlocked laterally here by means of arm pressure and is pivoted by means of a spring force by approximately 180° along the adjustment path 338. This is followed by latched adjustment options up to approximately 240°. With an overtravel of approximately 270° the additional vehicle driver's torso support device 312 falls back again into its parked position.

Figure 5A:
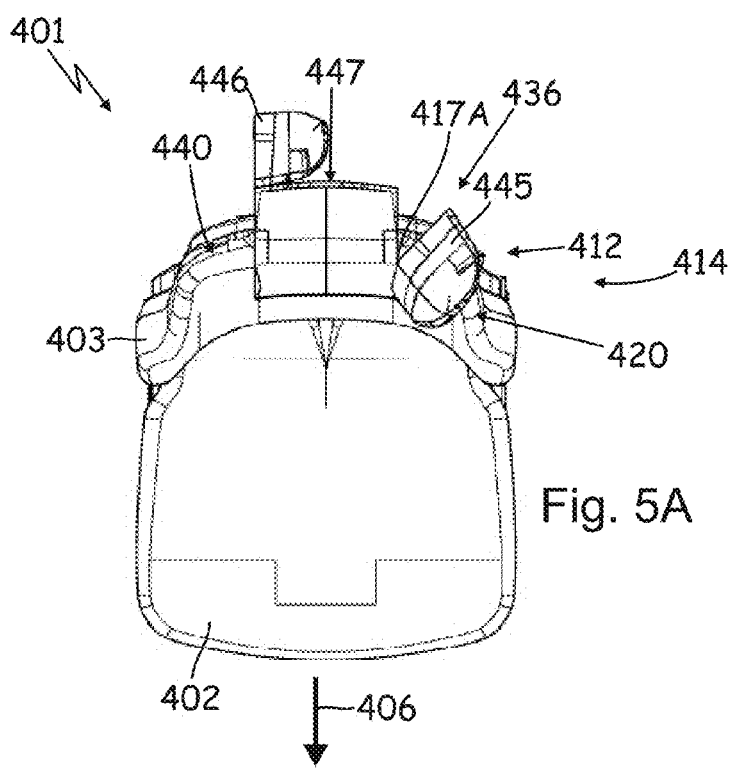
FIG. 5A shows schematically a plan view of a further vehicle seat with an alternative back extension device configured as a vehicle driver's torso support device in a special support operating state of the vehicle seat.
Figure 5B:
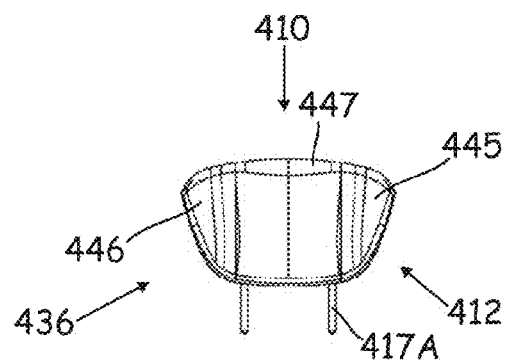
FIG. 5B schematically a detail view of the back extension device in a normal support operating state of the vehicle seat of FIG. 5A.

Also the vehicle seat 401 shown in FIGS. 5A and 5B for an agricultural commercial vehicle (not shown here) has a seat part 402, a seat back part 403 and seat back extension device 436. Furthermore, the seat back extension device 436 forms an additional vehicle driver's torso support device 412 with two wing elements 445 and 446.

In the normal support operating state 410 (see FIG. 5B) of the vehicle seat 401 the two wing elements 445 and 446 are aligned with a middle element 447 of the seat back extension device 436, whilst in a special support operating state 414 of the vehicle seat 401 they are folded back in a different manner.

In this case the wing element 445 which is on the left relative to a forward driving direction 406 is folded forwards on a left rotary retaining element 417A in the forward driving direction 406, so that it is disposed at least partially in an otherwise seat-free torso support region 420 above a upper third of the seat back part (not identified explicitly here) in front of the seat back part 403. In this respect while the driver sitting on the vehicle seat 401 adopts a seated working posture oriented to the side or backwards he can be provided with additionally targeted support, laterally off-centre of the seat back part 401, so that especially in this enforced posture he is particularly advantageously supported by the additional vehicle driver's torso support device 412. On the other hand the right wing element 446 is folded back, so that on the right side of the vehicle seat it is easier to look backwards and a rear arm rest device 440 is created.

When the driver of the vehicle has adopted a body posture oriented backwards, the actuation of the additional vehicle driver's torso support device 412 takes place by means of the elbow, which is also moved backwards when turning round, for example when driving backwards. The right wing element 446 is pushed away backwards by the elbow, and simultaneously the left wing element 445 is moved forwards by means of a mechanical connecting linkage (not shown here).

The further vehicle seat 501 shown in FIGS. 6A to 6D is installed in an agricultural commercial vehicle which is not shown in greater detail, and the vehicle seat primarily comprises a seat part 502, a seat back part 503 and a seat back extension device 536.

In the illustration according to FIG. 6A the vehicle seat 501 is in a normal support operating state 510 and in the illustration according to FIGS. 6C and 6D it is shown in each case in a special support operating state 514.

According to the invention the vehicle seat 1 provides an additional vehicle driver's torso support device 512 which can be moved in translation to the left 505 externally into an otherwise seat-free torso support region where, while the driver sitting on the vehicle seat 1 adopts a seated working posture oriented to the side or backwards, he can be provided with additionally targeted support, laterally off-centre of the seat back part 501, so that especially in this enforced posture he is particularly advantageously supported by the additional vehicle driver's torso support device 512.

For this purpose the additional vehicle driver's torso support device 512 has an adjustment device 550 (see in particular FIGS. 6B and 6D) which comprises a roller retaining device 551 on which a rigid flat strip element 552 can be moved in translation between the two support operating states 510 and 514. In this case the roller retaining device 551 is disposed on linkage 553 disposed at the top of the seat back part 503. The rigid flat strip element 552 is fastened to a frame part 554.

Furthermore a reinforcing element 555 is also provided on the additional vehicle driver's torso support device 512 and advantageously supports the lower more flexible part of the additional vehicle driver's torso support device 512 in particular in the special support operating state 514 (see FIGS. 6C and 6D).

In this case actuation of the additional vehicle driver's torso support device 512 again takes place by a corresponding elbow movement by the driver of the vehicle.

In this embodiment too, a rear arm rest device 540 is again advantageously provided in the special support operating state 514. The vehicle seat 601 illustrated in FIGS. 7A to 7B is again characterized primarily by a seat part 602, a seat back part 603 and an additional vehicle driver's torso support device 612. The additional vehicle driver's torso support device 612 is mounted on the left side 605 on the seat back part 603 so as to be rotatable about a vertical axis 617 and is configured as a sidepiece device 660 which can be folded away towards the rear.

If the foldable sidepiece device 660 is folded away towards the rear in such a way as is shown in FIG. 7A, the vehicle seat 601 is located in a normal support operating state 610. Otherwise, it is located in a special support operating state 614 in which the foldable sidepiece device 660 is moved forwards in an otherwise seat-free torso support region 620 (see FIG. 7B), in order advantageously to be able to provide an additional torso support for the driver of the vehicle in an enforced posture facing backwards. Folding away backwards in this way can take place particularly simply due to bodily force.

However, an operating element, ideally in a left arm rest device (not shown here), can be used for folding away. The sidepiece device 660 can also be folded out forwards into the otherwise seat-free torso support region 620 by an operating element, ideally placed on the right side of the vehicle 661 or to the right on the seat back part 603. However, such operating elements can be placed at any other conceivable location.

The vehicle seat 701 illustrated in FIGS. 8A to 8B again consists primarily of a seat part 702, a seat back part 703 and an arm rest device 704. The arm rest device 704 has an additional contact surface 726 and thus also implements an additional vehicle driver's torso support device 712 which can be moved into an otherwise seat-free region 720 when the arm rest device 704 is moved upwards. When the additional vehicle driver's torso support device 712 is placed on the vehicle seat 701 in this way, the driver of the vehicle can be very well supported on the vehicle seat over a long period of time when he is in an enforced posture, as has already been described several times above. In this case the additional vehicle driver's torso support device 712 is rotated about a horizontal axis 770.

Figure 9A:
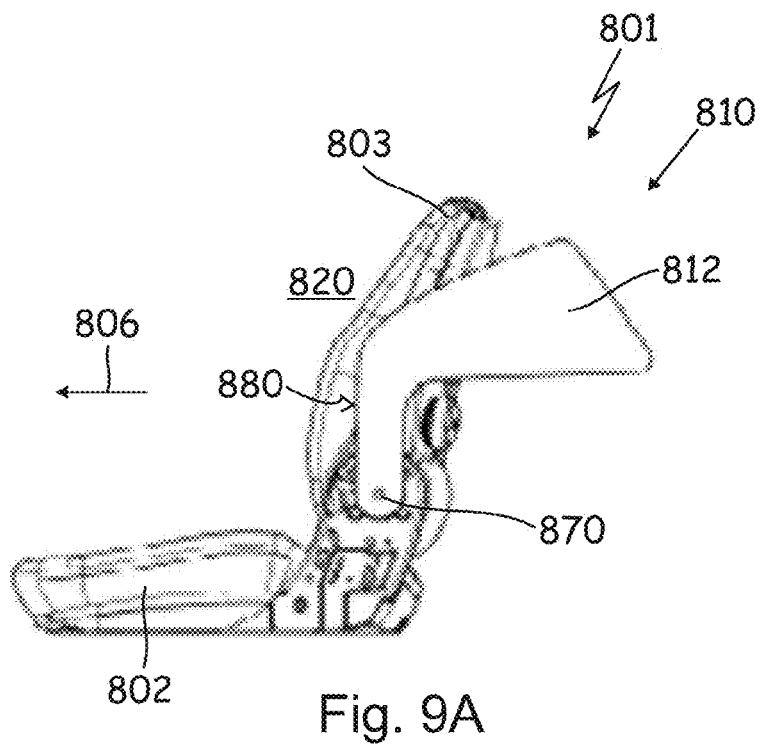
FIG. 9A shows schematically a side view of a vehicle seat with an additional vehicle driver's torso support device which is disposed laterally on a seat back part and pivoted backwards, in a normal support operating state of the vehicle seat.
Figure 9B:
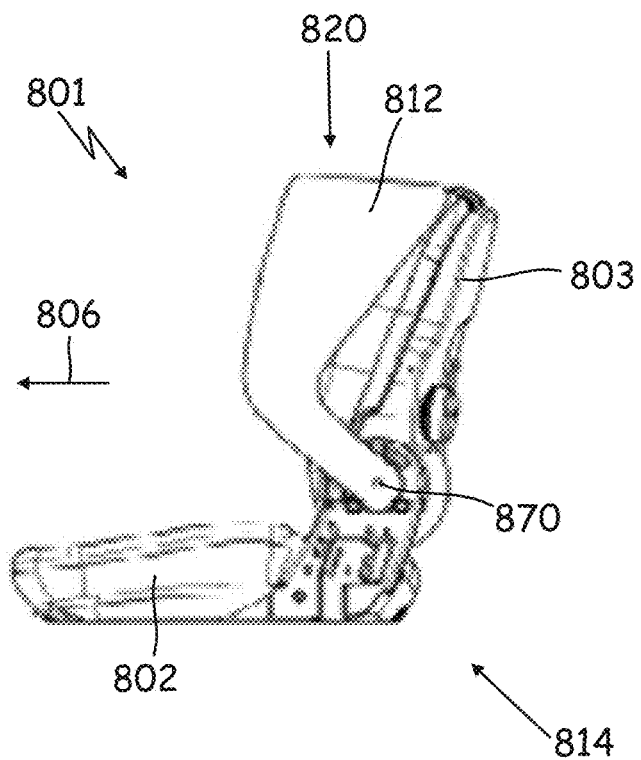
FIG. 9B shows schematically a further side view of the vehicle seat of FIG. 9A with the additional vehicle driver's torso support device moved into an otherwise seat-free torso support region in a special support operating state of the vehicle seat.

The alternative vehicle seat 801 shown in FIGS. 9A and 9B has a seat part 802 and a seat back part 803. An additional vehicle driver's torso support device 812, which in a normal support operating state 810 (see FIG. 9A) is placed at least partially behind the seat back part 803, is disposed laterally on the seat back part 803. In a special support operating state 814 (see FIG. 9B) the additional vehicle driver's torso support device 812 is located for the most part in an otherwise seat-free torso support region 820. Thus, within the meaning of the invention the additional vehicle driver's torso support device 812 can advantageously provide very good additional lateral support for a driver of the vehicle who is oriented backwards. In this case the additional vehicle driver's torso support device 812 is mounted so as to be pivotable about a horizontal axis 870.

This additional vehicle driver's torso support device 812 can be actuated for instance by the driver of the vehicle using his left elbow to touch an operating element (not shown here) on the underside 880 of the additional vehicle driver's torso support device 812 so that then the additional vehicle driver's torso support device 812 folds forwards in the forward travel direction 806. When the additional vehicle driver's torso support device 812 is moved away manually by the driver's left elbow it folds back again and engages there again firmly but releasably.

It will be understood that other solutions, such as for example electric, hydraulic or pneumatic drive means with appropriate operating elements for actuating the drive means can be advantageously provided in order to drive the additional vehicle driver's torso support device 812.

All the embodiments described above can be advantageously implemented as mechanical, electrical, hydraulic or pneumatic variants. For example in the case of mechanical variants the most varied mechanisms with rail guide devices, toothed wheel devices, slide devices or the like may be considered. Slidable layer elements are structurally advantageous which enable a relative displacement of two component devices with respect to one another in a very flat design, and which can for example slide over recess elements, into which an additional vehicle driver's torso support device with a latching element can slide, and hold the respective end position in a normal support operating state of a vehicle seat or in a special support operating state of the vehicle seat. The additional vehicle driver's torso support device can be moved both by automatic displacement by means of a preferably conscious movement of the body by a driver of the vehicle and also by actuation of an operating element. This latter may be achieved in the most varied ways, for instance electrically, hydraulically etc.

It will be understood that the embodiments explained above are merely a first embodiment of the vehicle seat according to the invention. In this respect the disclosure of the invention is not limited to these embodiments.

All the features disclosed in the application documents are claimed as essential to the invention in so far as they are individually or in combination novel over the prior art.

LIST OF REFERENCE NUMERALS 1 vehicle seat
2 seat part
3 seat back part
4 arm rest device
5 left side
6 forward driving direction
7 underside
10 normal support operating state
11 main outer contour
12 additional vehicle driver's torso support device
13 upper upholstered part element
14 special support operating state
15 curved device
16 lower upholstered part element
17 vertical axis
20 otherwise seat-free torso support region
21 upper third of the seat back part
25 facing side
26 additional contact surface
101 vehicle seat
102 seat part
103 seat back part
105 left side
110 normal support operating state
112 additional vehicle driver's torso support device
114 special support operating state
115 curved device
117 vertical axis
120 otherwise seat-free torso support region
130 clear visual range
201 vehicle seat
202 seat part
203 seat back part
207 underside
210 normal support operating state
211 main outer contour
212 additional vehicle driver's torso support device
214 special support operating state
217 vertical axis
217A rotary retaining element
220 otherwise seat-free torso support region
221 upper third of the seat back part
226 additional contact surface
235 top
236 seat back extension device
237 back support device
238 adjustment path
239 back contact surface
240 rear arm rest device
301 vehicle seat
302 seat part
304 arm rest device
305 left side
306 forward driving direction
310 normal support operating state
312 additional vehicle driver's torso support device
314 special support operating state 317 vertical axis
317A rotary retaining element
320 otherwise seat-free torso support region
326 additional contact surface
337 rotary retaining element
338 adjustment path
401 vehicle seat
402 seat part
403 seat back part
410 normal support operating state
412 additional vehicle driver's torso support device
414 special support operating state
417A rotary retaining element
420 otherwise seat-free torso support region
436 seat back extension device
440 rear arm rest device
445 left wing element
446 right wing element
447 middle element
501 vehicle seat
502 seat part
503 seat back part
510 normal support operating state
505 left
512 additional vehicle driver's torso support device
514 special support operating state
520 otherwise seat-free torso support region
536 seat back extension device
540 rear arm rest device
550 adjustment device
551 roller retaining device
552 rigid flat strip element
553 linkage
554 frame part
555 reinforcing element
601 vehicle seat
602 seat part
603 seat back part
605 left side
610 normal support operating state
612 additional vehicle driver's torso support device
614 special support operating state
617 vertical axis
620 otherwise seat-free torso support region
660 sidepiece device
661 right side of the vehicle seat
701 vehicle seat
702 seat part
703 seat back part
704 arm rest device
712 additional vehicle driver's torso support device
720 otherwise seat-free torso support region
726 additional contact surface
770 horizontal axis
801 vehicle seat
802 seat part
803 seat back part
806 forward driving direction
810 normal support operating state
812 additional vehicle driver's torso support device
814 special support operating state
820 otherwise seat-free torso support region
870 horizontal axis
880 underside

The invention claimed is:

1. Vehicle seat with a seat part and with a seat back part for supporting a driver of the vehicle in the sitting position on the vehicle seat, which comprises an additional vehicle driver's torso support device which can be disposed outside the seat part and the seat back part and which can be temporarily disposed at least partially in an otherwise seat-free torso support region at a level of or above an upper third of the seat back part in front of the seat back part and laterally off-center on the seat back part, in order to provide support, laterally off-center of the seat back part, at least at the level of the upper third of the seat back part when moved into the additional torso support position, wherein the additional vehicle driver's torso support device is disposed so as to be movable by a moving device from a parked position into an additional torso support position in the otherwise seat-free torso support region to provide in addition to a normal support operating state, at least one special support operating state in which the additional vehicle driver's torso support device can be disposed in front of the seat back part and temporarily delimits a free space for driver movement located above and to the side of the seat part.

2. Vehicle seat as claimed in claim 1, wherein the moving device has means for rotationally or translationally moving the additional vehicle driver's torso support device.

3. Vehicle seat as claimed in claim 1, wherein the seat part, the seat back part, a seat back extension device or an arm rest device form a main outer contour of the vehicle seat, and the additional vehicle driver's torso support device is retained on the seat back part so that the additional vehicle driver's torso support device can be temporarily disposed outside the main outer contour.

4. Vehicle seat as claimed in claim 1, wherein the additional vehicle driver's torso support device is disposed so that the additional vehicle driver's torso support device can be actuated interactively dependent upon the body posture.

5. Vehicle seat as claimed in claim 1, wherein the vehicle seat has on the seat back part an interactive actuating device which is dependent upon the vehicle driver's posture, wherein the additional vehicle driver's torso support device is disposed on the seat back part so that the additional vehicle driver's torso support device can be actuated by means of a pressure-actuated device on an upholstered part of the seat back part.

6. Vehicle seat as claimed in claim 1, wherein the vehicle seat has, in addition to a normal support operating state, at least one special support operating state in which the additional vehicle driver's torso support device can be disposed in front of the seat back part and temporarily delimits a free space for driver movement located above or to the side of the seat part.

7. Commercial vehicle, in particular an agricultural commercial vehicle, with a vehicle seat for a driver of the vehicle, which comprises a vehicle seat as claimed in claim 1.

8. Vehicle seat as claimed in claim 1, wherein the moving device has means for rotationally and translationally moving the additional vehicle driver's torso support device.

9. Vehicle seat as claimed in claim 1, wherein the seat part, the seat back part, a seat back extension device and an arm rest device form a main outer contour of the vehicle seat, and the additional vehicle driver's torso support device is retained on the seat back part so that the additional vehicle driver's torso support device can be temporarily disposed outside the main outer contour.

* * * * *